(12) United States Patent
Bastide et al.

(10) Patent No.: US 10,296,610 B2
(45) Date of Patent: May 21, 2019

(54) ASSOCIATING A POST WITH A GOAL

(71) Applicant: International Business Machines Corporation, Armonk, NY (US)

(72) Inventors: Paul R. Bastide, Boxford, MA (US); Matthew E. Broomhall, Goffstown, NH (US); Sean Callanan, Dublin (IE); James A. Hart, Concord, MA (US); Sandra L. Kogan, Newton, MA (US); Xujin Liu, Melbourne (AU)

(73) Assignee: International Business Machines Corporation, Armonk, NY (US)

(*) Notice: Subject to any disclaimer, the term of this patent is extended or adjusted under 35 U.S.C. 154(b) by 451 days.

(21) Appl. No.: 15/043,061

(22) Filed: Feb. 12, 2016

(65) Prior Publication Data
US 2016/0291809 A1    Oct. 6, 2016

Related U.S. Application Data

(60) Provisional application No. 62/141,247, filed on Mar. 31, 2015.

(51) Int. Cl.
*G06F 17/30*    (2006.01)
*G06Q 10/06*    (2012.01)
*G06Q 50/00*    (2012.01)
*H04L 12/58*    (2006.01)
(Continued)

(52) U.S. Cl.
CPC .. *G06F 17/30312* (2013.01); *G06F 17/30368* (2013.01); *G06F 17/30952* (2013.01); *G06Q 10/06398* (2013.01); *G06Q 10/10* (2013.01); *G06Q 50/01* (2013.01); *H04L 51/32* (2013.01); *H04L 65/403* (2013.01)

(58) Field of Classification Search
CPC ...... G06F 3/0482; H04L 51/32; H04L 65/403
See application file for complete search history.

(56) References Cited

U.S. PATENT DOCUMENTS 7,664,821 B1    2/2010    Ancin et al.
8,401,009 B1    3/2013    Dorsey et al.
8,682,723 B2    3/2014    Parsons et al.
(Continued)

OTHER PUBLICATIONS

Internation Business Machines Corporation, "Gaining full value from survey text," 2010, IBM Software Business Analytics, 12 pages.
(Continued)

*Primary Examiner* — Roland J Casillas
(74) *Attorney, Agent, or Firm* — Peter B. Stewart; Moore & Van Allen PLLC

(57) ABSTRACT

A method for associating a post with a goal may include receiving, by a processor, a special operator term entered by a user as part of a post. The special operator term may automatically cause the post to be associated with a selected goal. The method may also include providing, by the processor, a list of goals for selection by the user in response to receiving the special operator term and adding, by the processor, the selected goal from the list of goals to the post in response to the user selecting the select goal. The method may additionally include receiving, by the processor, content of the post entered by the user. The method may further include automatically associating, by the processor, the post with the selected goal from the list of goals.

13 Claims, 6 Drawing Sheets

(51) Int. Cl.
*H04L 29/06* (2006.01)
*G06Q 10/10* (2012.01)

(56) References Cited

U.S. PATENT DOCUMENTS

| | | | |
|---|---|---|---|
| 8,694,439 | B2 | 4/2014 | Shafique |
| 8,914,441 | B2 | 12/2014 | Quintuna |
| 9,143,468 | B1 | 9/2015 | Cohen et al. |
| 9,189,567 | B1 | 11/2015 | Goldman et al. |
| 2004/0181588 | A1 | 9/2004 | Wang et al. |
| 2006/0271526 | A1 | 11/2006 | Charnock et al. |
| 2007/0271336 | A1 | 11/2007 | Ramaswamy |
| 2011/0055335 | A1 | 3/2011 | Reilly et al. |
| 2011/0307403 | A1 | 12/2011 | Rostampour et al. |
| 2012/0136936 | A1 | 5/2012 | Quintuna |
| 2012/0143972 | A1 | 6/2012 | Malik et al. |
| 2012/0148034 | A1 | 6/2012 | Ferguson |
| 2012/0158630 | A1 | 6/2012 | Zaman et al. |
| 2012/0166532 | A1 | 6/2012 | Juan et al. |
| 2012/0290649 | A1 | 11/2012 | Ramirez et al. |
| 2013/0054708 | A1 | 2/2013 | Bhatt et al. |
| 2013/0185245 | A1 | 7/2013 | Anderson et al. |
| 2013/0254213 | A1 | 9/2013 | Cheng et al. |
| 2013/0325993 | A1 | 12/2013 | Rao |
| 2014/0012927 | A1 | 1/2014 | Gertzfield et al. |
| 2014/0025692 | A1 | 1/2014 | Pappas |
| 2014/0032667 | A1* | 1/2014 | Wright ............... H04L 65/403 709/204 |
| 2014/0082107 | A1* | 3/2014 | Gosling ............... H04L 51/32 709/206 |
| 2014/0142992 | A1 | 5/2014 | Nuzzi et al. |
| 2014/0195897 | A1 | 7/2014 | Balinsky et al. |
| 2014/0214510 | A1 | 7/2014 | Karri et al. |
| 2014/0214529 | A1 | 7/2014 | Gross-Baser et al. |
| 2014/0288985 | A1 | 9/2014 | Debow et al. |
| 2014/0316872 | A1 | 10/2014 | Lee |
| 2014/0379729 | A1 | 12/2014 | Savage et al. |
| 2015/0121291 | A1* | 4/2015 | Scott ............... G06F 17/3064 715/780 |
| 2015/0127748 | A1* | 5/2015 | Buryak ............... H04L 51/32 709/206 |
| 2015/0242893 | A1 | 8/2015 | Mirchandani et al. |
| 2015/0269155 | A1 | 9/2015 | Bastide et al. |
| 2015/0269848 | A1 | 9/2015 | Yuen et al. |
| 2015/0310020 | A1 | 10/2015 | Brav et al. |
| 2015/0334072 | A1 | 11/2015 | Agarwal et al. |
| 2015/0334073 | A1 | 11/2015 | Agarwal et al. |
| 2015/0381555 | A1 | 12/2015 | Faller et al. |
| 2016/0140608 | A1 | 5/2016 | Gaudet et al. |
| 2016/0212022 | A1 | 7/2016 | Abou Mahmoud et al. |
| 2016/0212024 | A1 | 7/2016 | Abou Mahmoud et al. |
| 2016/0213994 | A1 | 7/2016 | Tilton et al. |
| 2016/0291811 | A1 | 10/2016 | Bastide et al. |
| 2016/0301646 | A1 | 10/2016 | Abou Mahmoud et al. |
| 2016/0301651 | A1 | 10/2016 | Abou Mahmoud et al. |
| 2017/0011102 | A1 | 1/2017 | Goel et al. |

OTHER PUBLICATIONS

Liangjie Hong, Ovidiu Dan, Brian D. Davison, "Predicting Popular Messages in Twitter", Department of Computer Science and Engineering, Lehigh University, WWW 2011, Mar. 28-Apr. 1, 2011, ACM, citeseerx.ist.psu.edu/viewdoc/download, pp. 1 and 2.
Sanebox; "Your Email Without SaneBox," Downloaded from the Internet on Jul. 2, 2015, pp. 1-10 http://www.sanebox.com/l/how-it-works#sthash.hEqocKRM.SmV6aodi.dpbs.
International Business Machines Corporation, "List of IBM Patents or Patent Applications Treated as Related," submitted Feb. 20, 2017, 2 Pages.
Parr, Ben; "BREAKING: Facebook Introduces @Mentions in Status Updates," Mashable M, 2009, pp. 1-9.
International Business Machines; "Analyzing survey text: a brief overview," IBM Software, Business Analytics, SPSS Text Analytics for Surveys, 2010, pp. 1-12.
Cano, A.E., et al.; "Capturing Entity-Based Semantics Emerging from Personal Awareness Streams," 1st Workshop on Making Sense of Microposts, 2011, pp. 33-44.
International Business Machines; "SPSS Text Analytics for Surveys," downloaded from <http://www-03.ibm.com/software/products/en/spss-text-analytics-surveys> on Aug. 12, 2014, pp. 1-2.
International Business Machines; "SPSS Statistics," downloaded from <http://www-01.ibm.com/software/analytics/spss/products/statistics/> on Aug. 12, 2014, pp. 1-2.
Wikipedia; "Natural Language Processing," downloaded from <http://en.wikipedia.org/wiki/Natural_language_processing> on Aug. 12, 2014, pp. 1-11.
Wikipedia; "Mention (blogging)," downloaded from <http://en.wikipedia.org/wiki/Mention_%28blogging%29> on Apr. 6, 2015, pp. 1-3.
Twitter, Inc.; "What are @replies and mentions?" Twitter Help Center, downloaded from <http://support.twitter.com/articles/14023-what-are-replies-and-mentions> on Apr. 6, 2015, p. 1.
Sanebox, "Email Overload in the Enterprise: The science behind email productivity," No Publication Date, pp. 1-8.
Using a Jive Community, No Publication Date, pp. 1-59.
International Business Machines Corporation, "List of IBM Patents or Patent Applications Treated as Related," submitted May 20, 2016, 2 Pages.
International Business Machines Corporation, "List of IBM Patents or Patent Applications Treated as Related," submitted Mar. 30, 2016, 2 Pages.

* cited by examiner

| UNIQUE GOAL ID 204 | GOAL NAME 206 | GOAL DESCRIPTION 208 | GOAL OWNER(S) 210 | PUBLIC/ PRIVATE 212 | SUBSCRIBERS/ FOLLOWERS 214 | OTHER INFORMATION 216 | POST 218 |
|---|---|---|---|---|---|---|---|
| 1 | PERFORMANCE IMPROVEMENT | DESCRIPTION OF PERFORMANCE TO BE IMPROVEMENT | SAM | PUBLIC | ALICE, BOB | UPDATE MONTHLY | COMPLETE A BY DATE XYZ |
| ... | ... | ... | ... | ... | ... | ... | ... |
| N | COMPLETE PROJECT ABC | PROJECT ABC DESCRIPTION | PROJECT SUPERVISOR | PRIVATE | PROJECT SUPERVISOR | UPDATE WEEKLY | REVIEW COMPLETED TASKS |

202 LOOK-UP TABLE

FIG. 2

ASSOCIATING A POST WITH A GOAL

CROSS-REFERENCE TO RELATED APPLICATIONS

This application claims the benefit of U.S. Provisional Application No. 62/141,247, filed Mar. 31, 2015.

BACKGROUND

Aspects of the present invention relate to communications networks, social networks, message boards, online mail clients and the like, and more particularly to a method, system and computer program product for associating a post to a goal.

Performance management or social performance may involve setting goals, feedback related to those goals and appraisal or evaluation of meeting the goals. Goals may typically be defined once per year. Formal feedback may be given on request and may typically be once per year. Appraisal of the goal or goals may take a manager many hours to complete with access to only the latest data or whatever the employee/manager was able to pull together at that moment. Accordingly, relevant feedback on goal completion and performance may be lost in the system and never taken into account. Goal definition and feedback may be disconnected from the work stream and from tools used on a daily basis. Thus, gathering feedback for an annual appraisal may be quite burdensome involving a significant amount of time and effort if done thoroughly and involving review of a substantial quantity of mail, notes and calendar entries.

BRIEF SUMMARY

According to one embodiment of the present invention, a method for associating a post with a goal may include receiving, by a processor, a special operator term entered by a user as part of a post. The special operator term automatically causes the post to be associated with a selected goal. The method may also include providing, by the processor, a list of goals for selection by the user in response to receiving the special operator term and adding, by the processor, the selected goal from the list of goals to the post in response to the user selecting the select goal. The method may additionally include receiving, by the processor, content of the post entered by the user. The method may further include automatically associating, by the processor, the post with the selected goal from the list of goals.

According to another embodiment of the present invention, a system for associating a post with a goal, the system may include a processor and a module operating on the processor for associating a post with a goal. The module may be configured to perform a set of functions that may include receiving a special operator term entered by a user as part of a post. The special operator term automatically causes the post to be associated with a selected goal. The set of functions may also include providing a list of goals for selection by the user in response to receiving the special operator term and adding the selected goal from the list of goals to the post in response to the user selecting the select goal. The set of functions may additionally include receiving content of the post entered by the user. The set of functions may further include automatically associating the post with the selected goal from the list of goals.

According to another embodiment of the present invention, a computer program product for associating a post with a goal. The computer program product may include a computer readable storage medium having program instructions embodied therewith. The computer readable storage medium is not a transitory medium per se and the program instructions are executable by a device to cause the device to perform a method that may include receiving a special operator term entered by a user as part of a post. The special operator term automatically causes the post to be associated with a selected goal. The method may also include providing a list of goals for selection by the user in response to receiving the special operator term and adding the selected goal from the list of goals to the post in response to the user selecting the select goal. The method may additionally include receiving content of the post entered by the user. The method may further include automatically associating the post with the selected goal from the list of goals.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is an example of a look-up table in accordance with an embodiment of the present invention.

DETAILED DESCRIPTION

Figure 1A:
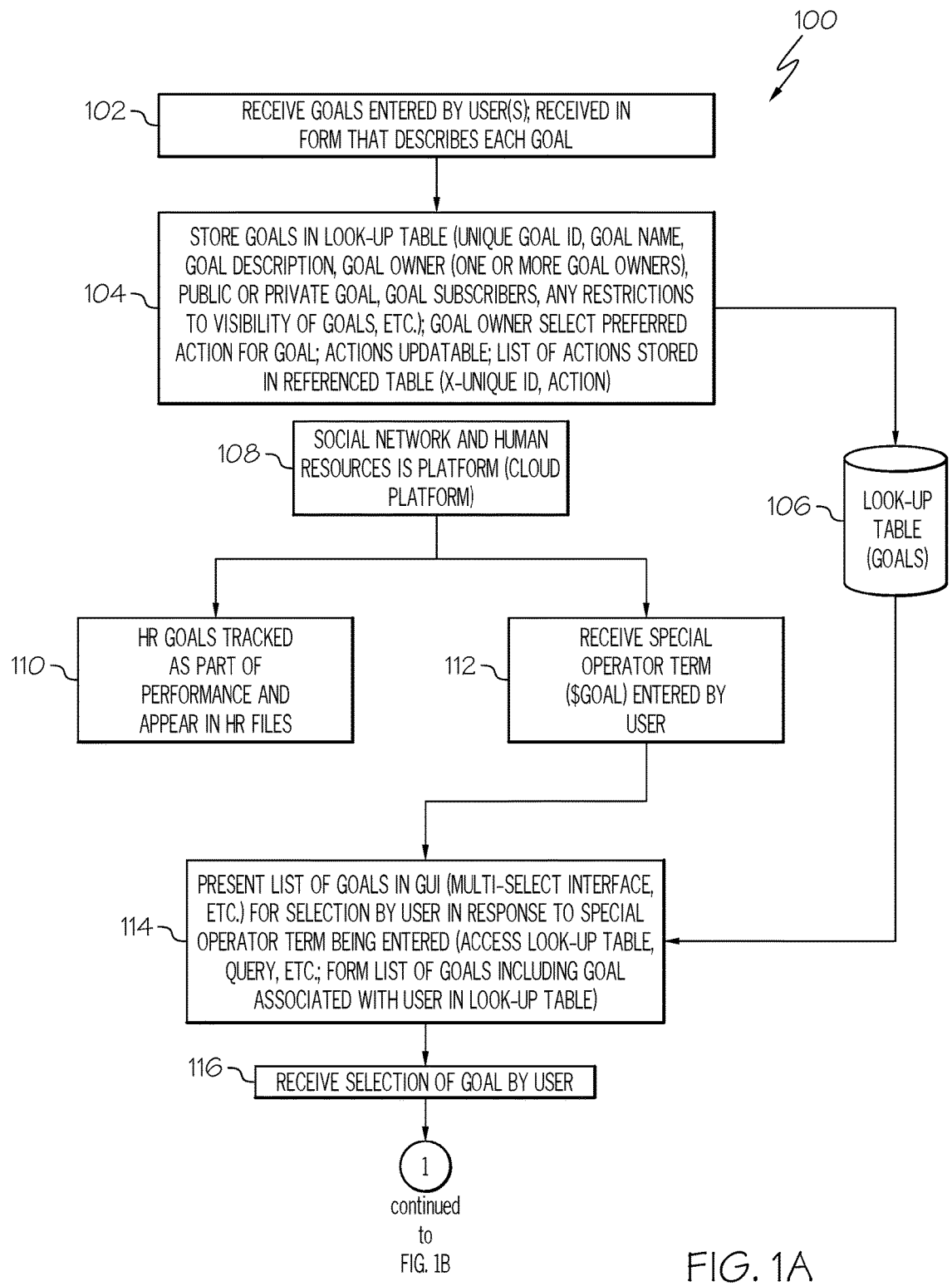
FIGS. 1A-1C (collectively FIG. 1) are a flow chart of an example of a method for associating a post with a goal in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Hashtags may typically be used for giving a semblance of organization for social network posts, such as on Twitter, Facebook, IBM Connections, etc. Hashtags may also be used for searching content or enabling users to follow topics. When a user makes a post there may be a difference between wanting the post to be associated with a hashtag and wanting to emphasize to followers of the hashtag for interaction, feedback, or for your information (FYI) or other purposes. Therefore, an additional mechanism or feature may be needed to differentiate between a post being related to an particular topic or content and a post the user or poster wants to "emphasize" or "draw responses" for or to perform some other function with respect to the post, such as associate the post with a goal or some other item.

A user may identify a post as belonging to a goal ($goal) upon crafting or creating the post. An action may automatically be taken related to the goal. Examples of actions may include but is not necessarily limited to notifying a person, such as a sponsor, subscriber, follower or other person or entity; scheduling a notification, e.g. notify the person at a set interval—one week, one day, one hour; analyzing the post for goal completeness (goal may be removed if complete); adding or removing sponsors based on characteristics of the post associated with the goal; automatically sorting or filtering views based on goal completeness; or other actions.

The post may be any collaboration artifact. Example of a post may include, but is not necessarily limited to social update, chat, email, wikis, blogs, comment, tags or even online documents.

The goal may be public or private, and the visibility or authorization to view of access the goal may be related to whether the goal is public or private. The goal may be a shared goal where several people (or a group) share the same goal. A feature of the invention may enable the aggregation of multiple people in order to identify activities related to a goal. These features improve the collaboration portfolio, aid Group attention management, manage information overload for a group, reduce the effects of emailing large groups, provide more accurate, relevant performance appraisals, and reduce time and effort involved in performance appraisals.

An "@mention" construct or similar arrangement may be used as a notification mechanism. The @mention may be used to direct a goal or comment about a goal to a specific person or group of persons.

Figure 1B:
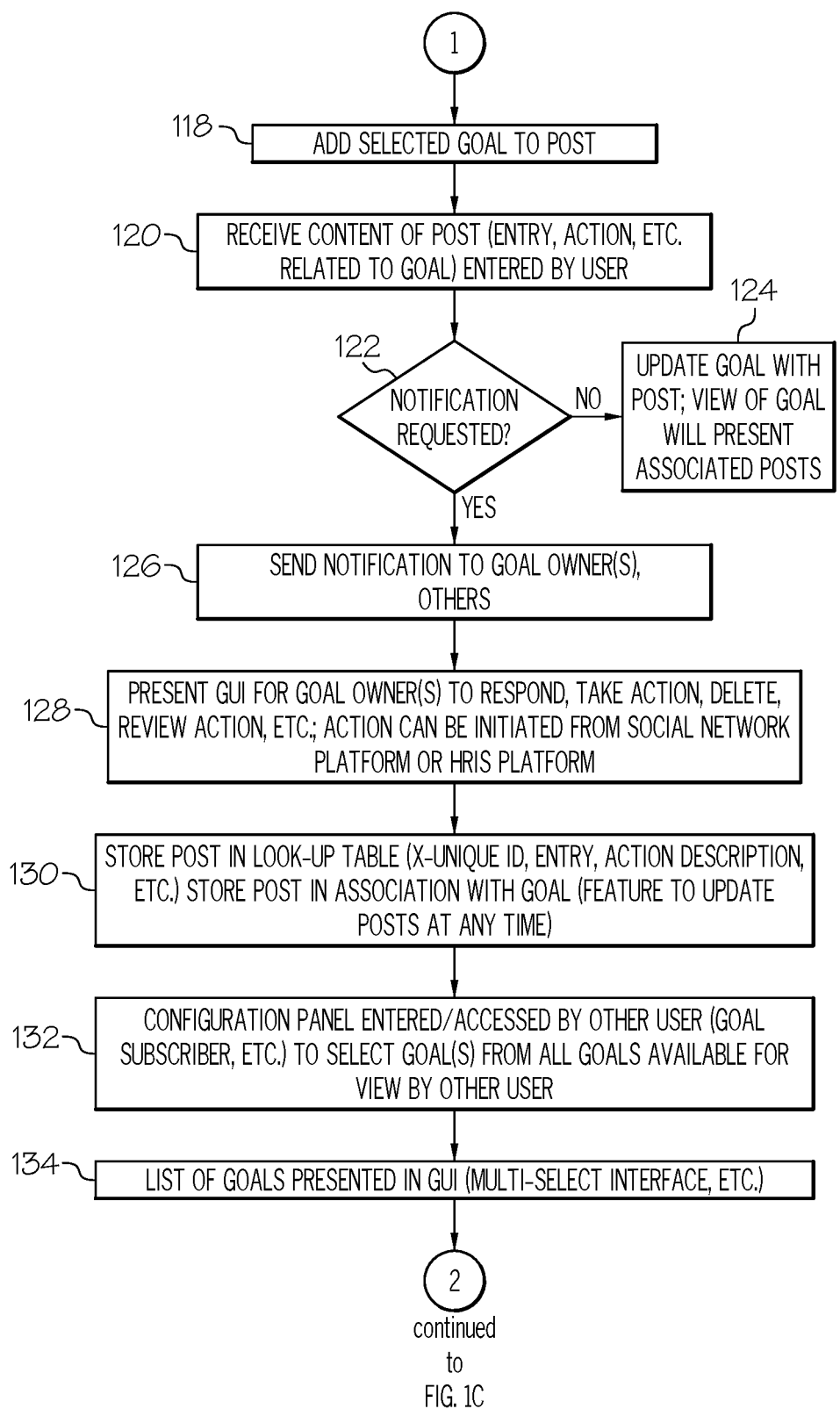
Figure 1C:
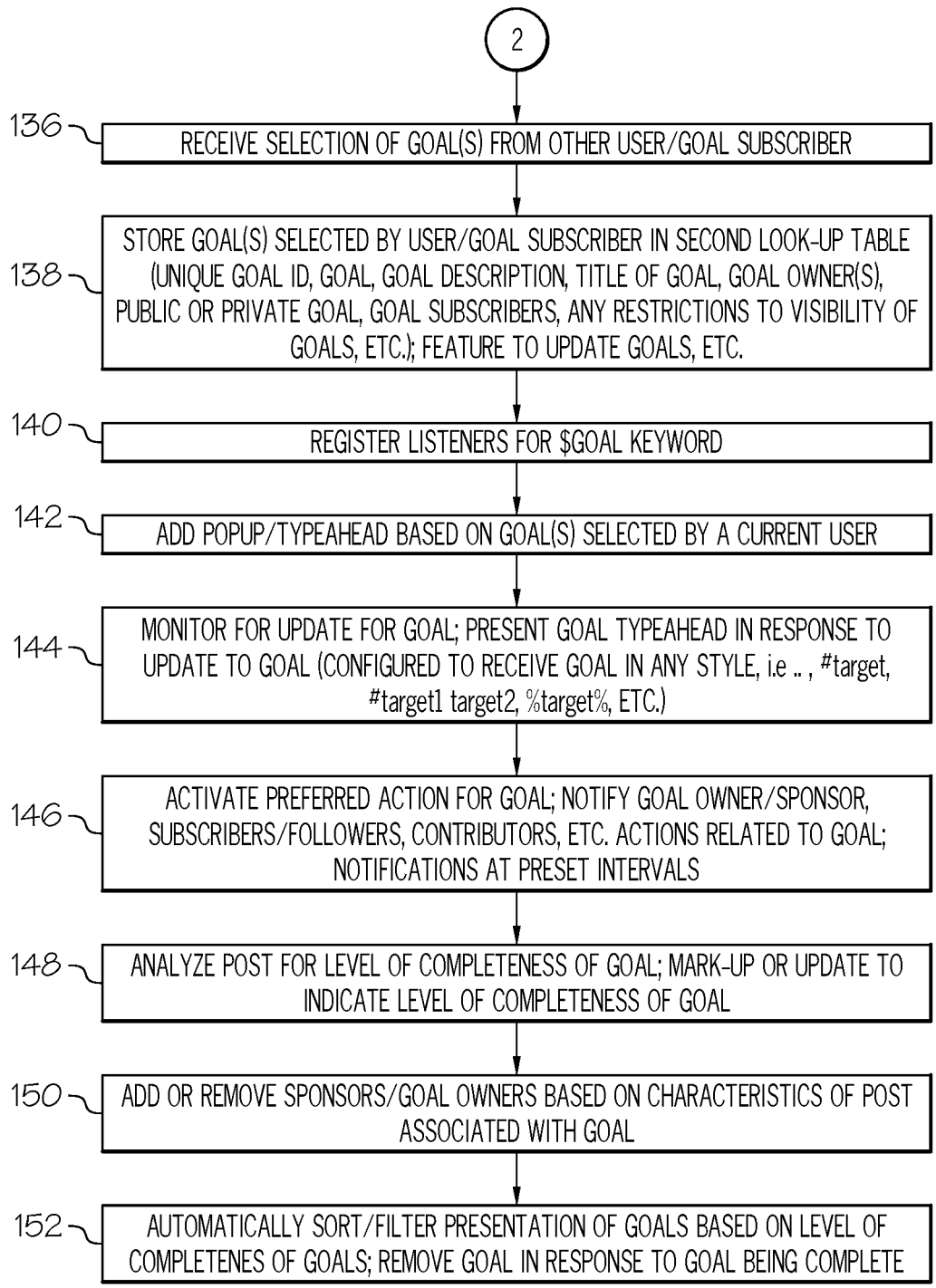

FIGS. 1A-1C (collectively FIG. 1) are a flow chart of an example of a method 100 for identifying a post as belonging to a goal in accordance with an embodiment of the present invention. In block 102, a goal or goals may be received from a user. A goal owner or user may enter the goal in a form that describes the goal.

In block 104, the goals may be stored in a look-up table 106. The look-up table 106 may include information associated with each goal. Referring also to FIG. 2, FIG. 2 is an example of a look-up table 200 in accordance with an embodiment of the present invention. The look-up table 200 may be used for the look-up 106 in FIG. 1. The look-up table 200 may include a plurality of rows 202a-202n and a plurality of columns 204-216. Each row 202a-202n may correspond to a different goal. The plurality of columns may include a first column 204 containing a unique identification (ID) associated with the goal corresponding to each row 202a-202n. A second column 206 may include a name of the goal or a title of the goal corresponding to each row 202a-202n. A third column 208 may contain a description of the goal corresponding to the row 202a-202n. A fourth column 210 may include an identification of a goal owner for the goal corresponding to the row 202a-202n. A fifth column 212 may indicate whether the goal is a public or private goal or whether the visibility or view of the goal corresponding to the row 202a-202n is restricted to certain users or groups of users or subscribers. A sixth column 214 may include a list of subscribers or followers associated with the goal. A seventh column 216 may include any other information that may be useful in association with the goal corresponding to the particular row 202a-202n in the look-up table 200. An eighth column 218 may include posts associated with the goal or a link to the posts associated with the goal corresponding to the row 202a-202n. A goal may include more than one goal owner and may include more than one subscriber or follower.

Referring back to FIG. 1A, a social network platform 108 and/or human resources (HR) information systems (IS) platform may be used to implement the invention. The social network 108 or human resources IS platform may reside on a cloud computing platform or may be part of a cloud computing platform. An online social network may be defined as a series of connections between users. The connections allow users to communicate with other users of the social network using messages. A communication or message from a user or member of the social network may be to the entire social network or part of the social network. For example, the communication may be to a private list, a circle of users or specific group of users. The social network enables users to share active content and textual content. Examples of active content may include but is not necessarily limited to likes, links to online entities, resources, materials or other items of content. Textual content may include formatted or unformatted text describing what a person is doing, working on, events, etc.

In block 110, human resources goals may be tracked as part of performance and appear in HR files.

In block 112, a predetermined input with a post may be received from a user on the social network for association with a selected goal. The predetermined input may be a special operator term entered by the user. The special operator term may indicate that the post following the special operator term is to be associated with a selected goal. The special operator term may call for a particular operation or function to be automatically performed analogous to the "@mention" feature previously described except the special operator term preceding the post automatically invokes predetermined operations as described in more detail herein for associating the post with a selected goal or goals and for performing other automatic functions or operations as described herein. The special operator term may be, for example, "$goal" or some other special operator term. The special operator term "$goal" automatically causes the post, including the content of the post that may follow the special operator term "$goal," to be associated with a selected goal from a list of goals stored in the look-up table 106.

A predetermined action may be automatically taken in response to the special operator term, $goal. Examples of the automatic action may include but is not necessarily limited to generating and sending a notification to a person or user, such as a sponsor, owner, subscriber or follower of the goal; scheduling a notification, e.g., notifying a person or user at a set interval, such as one week, one day, one hour, etc.; analyzing the post associated with the goal to determine a level of completeness of the goal; whether a sponsor can be added or removed based on characteristics of the post associated with the goal; and automatically sort or filter views of the posts associated with the goal based on goal completeness.

The post may be any entry, such as a text entry or other entry by the user for association with the selected goal. The post may also be a particular action for performance with respect to the selected goal. Examples of posts may include but is not limited to any collaboration artifact, such as social update, chat, email, wikis, blogs, comment, tags, online documents, etc. As previously described, the post may be public or private and the visibility or access may be limited to certain users based on the goal being public or private. The goal may be a shared goal where several users or a group of users share the same goal. Aggregation of multiple users may be enabled to identify activities related to a particular goal.

Figure 3:
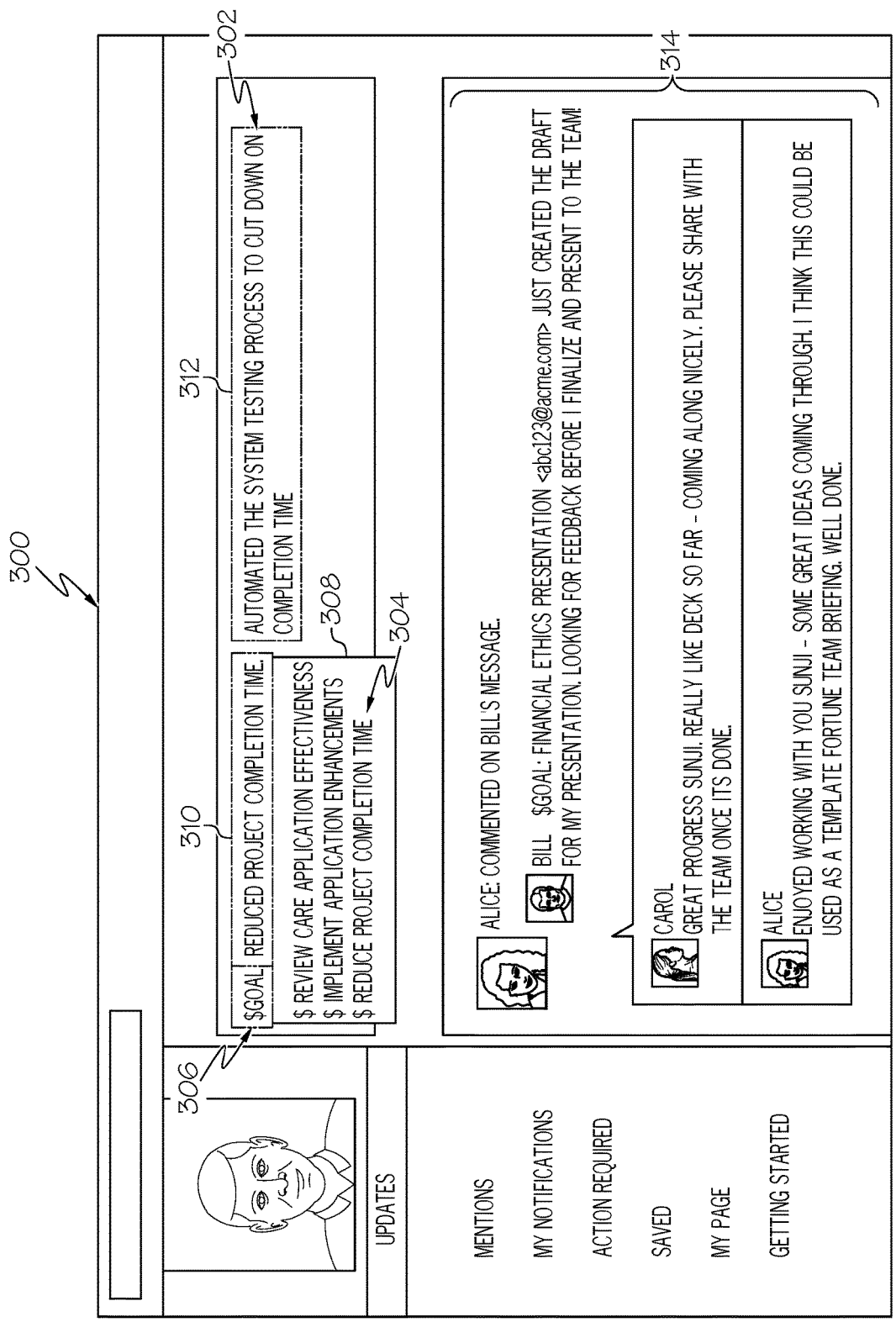
FIG. 3 is an example of graphical user interface for associating a post with a selected goal in accordance with an embodiment of the present invention.

In block 114, a list of goals from the look-up table 106 may be presented in a graphical user interface (GUI) for selection by the user in response to receiving the special operator term, such as $goal, from the user. Referring also to FIG. 3, FIG. 3 is an example of graphical user interface (GUI) 300 for associating a post 302 with a selected goal 304 in accordance with an embodiment of the present invention. In response to the user entering the special operator term, "$goal" 306, a list of goals 308 associated with the user or for which the user is responsible may be presented in the GUI 300 for selection by the user. The list of goals 308 may be presented in a drop down list as illustrated in the exemplary GUI 300 or in another arrangement or order. A particular goal or goals may be selected from the list of goals 308 by the user using the GUI 300 for associating the post 302 (text entry, action to be performed in association with the goal, etc.) with the selected goal 304 or goals. The GUI 300 may be a multi-select interface or other type of interface. The look-up table 106 (FIG. 1A) may be accessed or a query may be automatically generated, based on at least the special operator term $goal 306 and an identify of the poster or user, to present the list of goals 308 from the look-up table 106 in the GUI 300 that may be associated with the poster or for which the poster may have responsibility or some other connection.

In block 116, a selection of a goal 304 or goals by the user may be received. In block 118, the selected goal 304 may be added to the post 302 after the special operator term $goal 306. In the example shown in FIG. 3, the selected goal 304 is "$ Reduce project completion time" which is automatically added to the post 302 as illustrated by the broken line 310.

In block 120, a content 312 of the post 302 entered by the user may be received and included in the post 302 following the selected goal 310 as shown in the example of FIG. 3. The GUI 300 may also include an activity stream 314 including messages or posts from other users or participants in the social network.

In block 122, a determination may be made whether a notification of association of the post with the selected goal was requested by the goal owners or other entities as part of the special operation term $goal. If a notification was not requested, the method 100 may advance to block 124. In block 124, the selected goal or goals may be updated with the post. Any access or view of the goal will present any associated posts.

If notification was requested, the method 100 may advance to block 126. In block 126, a notification of association of the post with the selected goal or goals may be sent to the goal owner or owners and/or other authorized requesters. In block 128, a second GUI may be presented to the goal owner or owners that may include features for responding to the notification. For example, the goal owner or owners may select to take a particular action. Example of the particular action may include but is not necessarily limited to reviewing the post, deleting the post or goal, revising the post or some other action. The particular action may be initiated from the social network platform or human resources information services (HRIS) platform.

In block 130, the post may be stored in association with the selected goal or each selected goal. The post may be stored in association with the selected goal or each selected goal in the look-up table 106 or in another table or database. The post may be stored with an X-unique-ID entry, action, description or other information or details associated with the post. The X-unique-ID is a link between the original post and the look-up table 106 for the goal.

A goal owner or other user may correspondingly select a preferred action for a selected goal. The goal or a list of goals may be presented in a graphical user interface, such as a multi-select interface or comparable user interface. The selected action or actions may be stored in association with the goal or goals. Actions associated with goals may be updated at any time. The action or list of actions may be stored in a reference table. The reference table may include information including but not necessarily limited to the unique identification (X-Unique-ID) associated with the action, a description of the action and any other information associated with the action that may be useful. The goal or list of goals may be presented in response to a user action, such as for example, accessing the reference table, submitting a query, activating a link in a post or any other action that may allow a user to access the reference table.

In block 132, a configuration panel may be accessed or entered by a goal subscriber to select a goal or goals from a list of goals that may be available for viewing by the particular goal subscriber. In block 134, the list of goals may be presented in a graphical user interface associated with the configuration panel. The graphical user interface may be a multi-select interface or comparable user interface.

In block 136, a selection of a goal or goals by the goal subscriber may be received, and in block 138, the goal or list of goals selected by the subscriber may be stored in a second look-up table. The second look-up table may include similar information to the exemplary look-up table 200 in FIG. 2.

In block 140, listeners for the goal or $goal keyword may be registered. In block 142, a popup or typeahead may be provided based on a goal or goals the current user has selected.

In block 144, the method 100 or system may monitor for updates for the posts, or the list of goals, and present the goal typeahead in response to detecting an update to a goal or post. Updates to a goal or post may be received in any style, such as for example, #target, #target1 target2, or % target % or others.

In block 146, actions or preferred actions for a particular goal or chosen goal may be activated. Examples of the actions for the particular goal may include but is not necessarily limited to notify a person, such as a sponsor, subscriber or follower; schedule a notification, e.g., notify a person at a set interval, such as one week, one day, one hour, etc.; analyze a post for goal completeness or a level of completeness of the goal, whether a sponsor can be added or removed based on characteristics of the post associated with the goal; automatically filter or sort views based on goal completeness; or other actions. Generalized actions may be used gain attention of a sponsor, manager, or engage a person with a similar goal. Examples of persons that may be notified may include a sponsor or goal owner, subscriber or followers, contributors or others. A sponsor or owner may be a person or entity directly responsible for the goal. Subscribers or followers may include those interested in the progression of the goal. Contributors may include those contributing or also working towards the goal. The notifications may be sent at a set interval (batched), for instance, once a week, once a day, once every hour or other appropriate time interval based the goal and expected progress toward completion.

In block 148, analysis of the post for goal completeness may be performed. An update may be generated or marked-up to indicate completeness of the goal, for example, red less than 35% of the goal is complete, yellow between 35% and 70% of the goal is complete, and green above 70% of the goal is complete. The goal may be removed if completed.

In block 150, sponsors or goal owners may be added or removed based on characteristics of the post associated with the goal.

In block 152, views of the goals based on completeness of the goals may be automatically sorted and filtered in response to goals being completed or progress toward completion being updated.

Corresponding social activities, such as for example "repost", "like" or comment on a "$goal" status update may be used to weight the "post".

Other features may include providing a feature that allows the goal subscriber to select the preferred action upon completing the post. Analysis of the history of posts to the goal may determine how complete the goal may be. The color of the goal may also be changed to represent a more complete goal similar to that described above. Some posts may be kept private and other post public by using circles or groups or communities to control the visibility of the update or post. A single user may also post goal updates on behalf of others and a user may be enabled to add goal updates to goals which are not their own. A user may also add to the goal post-update. The aggregation of multiple people may be enabled in order to identify activities related to a goal. For example, several people may be working on a larger goal and groups of people may be working on sub-goals of the larger goal.

Figure 4:
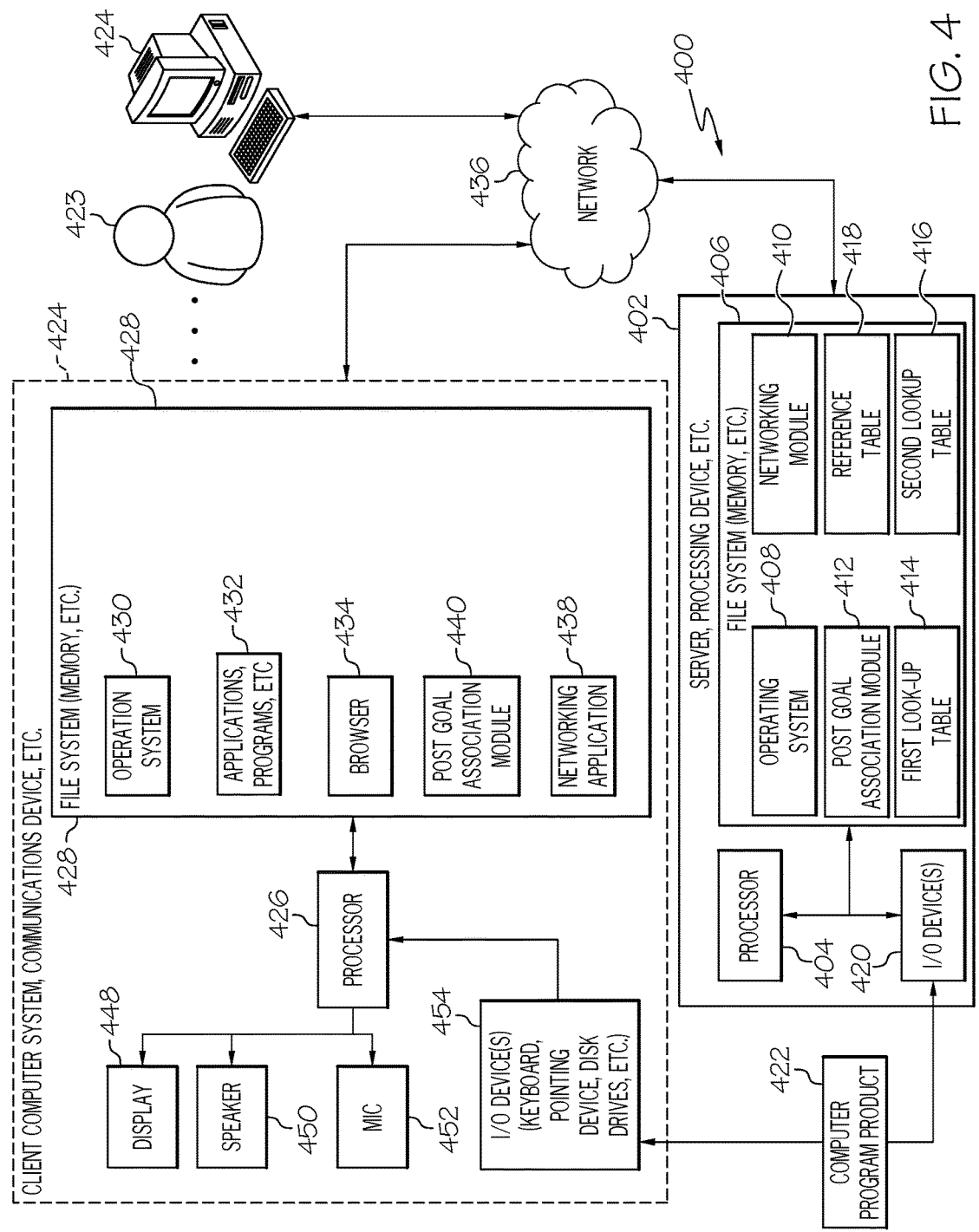
FIG. 4 is a block schematic diagram of an example of a system for associating a post with a goal in accordance with an embodiment of the present invention.

FIG. 4 is a block schematic diagram of an example of a system 400 for associating a post with a goal in a network in accordance with an embodiment of the present invention. The method 100 of FIGS. 1A-1C may be embodied in and performed by the system 400. The system 400 may include a processing device 402. The processing device 402 may be a server or similar processing device. The processing device 402 may include a processor 404 for controlling operation of the processing device 402 and for performing functions, such as those described herein with respect to associating a post with a goal. The processing device 402 may also include a file system 406 or memory. An operating system 408, applications and other programs may be stored on the file system 406 for running or operating on the processor 404. A networking module 410 or system may also be stored on the file system 406 and may be compiled and run on the processor 404 to perform communications between users or member of a social network similar to that described herein. The networking module 410 may be any type of online communications mechanism for online communications or conversations.

A module 412 for associating a post with a goal may also be stored on the file system 406. The method 100 of FIGS. 1A-1C may be embodied in the module 412 for associating a post with a goal and may be performed by the processor 404 when the module 412 is compiled and run on the processor 404. The module 412 may operate in association with the networking module 410 and other types of communications media to perform the functions and operations associated with the method 100. In another embodiment, the module 412 may be a component of the networking module 410 and may operate in association with the networking module 410 and other communications media.

A first look-up table 414 for storing goals of a goal owner and second look-up table 416 for storing selected goals of a goal subscriber may also be stored on the file system 406. A reference table 418 for storing actions associated with the goals may also be stored on the file system 406.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the module 412 for associating a post with a goal. At least one of the I/O devices 420 may be a device to read a computer program product, such as computer program product 422. The computer program product 422 may be similar to that described in more detail herein. The networking module 410 and the module 412 for associating a post with a goal may be loaded on the file system 406 from a computer program product, such as computer program product 422.

A member of a network, such as a social network, or user 423 of the system 400 may use a computer system 424 or communications device to access the processing device 402 or server, networking module 410 or system and module 412 for associating a post with a goal. The computer system 424 or communications device may be any sort of communications device including a mobile or handheld computer or communications device. The computer system 424 may include a processor 426 to control operation of the computer system 424 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

A networking application 438 for may also be stored on the file system 428 and operate on the processor 426 of the user's computer system 424.

In accordance with an embodiment, an application 440 for associating a post with a goal may also be stored on the file system 438. The method 100 in FIGS. 1A-1C, or at least portions of the method 100, may be embodied in and performed by the application 440 for associating a post with a goal. In accordance with another embodiment, the application 440 for associating a post with a goal may be part of the networking application 438.

The application 440 for associating a post with a goal operating on the computer system 424 may interface with or operate in conjunction with the module 412 for associating a post with a goal on the processing device 402 or server to perform the functions and operations described herein for building or enhancing a relationship between users. Accordingly, the application 440 for associating a post with a goal operating on the computer system 424 may perform some of the functions and operations of the method 100 and the module 412 for associating a post with a goal operating on the server 402 may perform other functions of the method 100. Some embodiments of the present invention may include only the module 412 for associating a post with a goal operating on the processing device 402 or server, and other embodiments may include only the application 440 for associating a post with a goal operating on the client computer system 424 or communications device.

The client computer system 424 may also include a display 448, a speaker system 450, and a microphone 452 for voice communications. One or more user interfaces may be presented on the display 448 for controlling operation of the application 440 for associating a post with a goal and for performing the operations and functions described herein.

The computer system 424 may also include one or more input devices, output devices or combination input/output devices, collectively I/O devices 454. The I/O devices 454 may include a keyboard or keypad, pointing device, such as a mouse, disk drives and any other devices to permit a user, such as user 423, to interface with and control operation of the computer system 424 and to access the application 440 for associating a post with a goal and/or the module 412 for associating a post with a goal on server 402. The I/O devices 454 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A system for associating a post with a goal, the system comprising:
    a processor;
    a memory storing a set of program instructions, that when executed by the processor perform a set of functions comprising:
    receiving a special operator term entered by a user as part of a post, the special operator term automatically causing the post to be associated with a selected goal;
    upon completion of entering the special operator term, presenting a list of goals in a graphical user interface for selection by the user in response to receiving the special operator term, wherein the list of goals is used in a performance appraisal;
    adding and displaying the selected goal from the list of goals in association with the post in response to the user selecting the select goal;
    receiving content of the post entered by the user; and
    automatically associating the post with the selected goal from the list of goals.

2. The system of claim 1, wherein the set of functions further comprises storing the post in association with the selected goal in a look-up table.

3. The system of claim 1, wherein providing the list of goals comprises:
    accessing a look-up table for goals associated with the user;
    forming the list of goals including goals in the look-up table associated with the user; and
    presenting the list of goals in a user interface for selection by the user.

4. The system of claim 1, wherein receiving content of the post comprises receiving an action to be performed related to the selected goal.

5. The system of claim 1, wherein the set of functions further comprises:
    determining that a notification was requested in response to the post being associated with the selected goal; and
    sending the notification to at least a goal owner in response to the notification being requested.

6. The system of claim 5, wherein the set of functions further comprises presenting a graphical user interface to the goal owner for performing a particular action, the particular action comprising one of responding to the post, deleting the post, and performing another action related to the post.

7. The system of claim 1, wherein the set of functions further comprises:
    presenting all goals viewable by a particular user in response to the particular user accessing a configuration panel;
    listing the goals viewable by the particular user in a user interface associated with the configuration panel for selection by the particular user; and
    storing the goals selected by the particular user in a look-up table.

8. The system of claim 1, wherein the set of functions further comprises presenting each post associated with the selected goal in response to the selected goal being viewed.

9. The system of claim 1, wherein the set of functions further comprises analyzing the post to determine a level of completeness of the goal associated with the post.

10. The system of claim 9, wherein the set of functions further comprises sorting a presentation of a plurality of goals based on the level of completeness of each goal.

11. The system of claim 1, wherein the set of functions further comprises storing the post in association with the selected goal in a look-up table, the look-up table comprising for each goal a unique goal identification, a name of the goal, a description of the goal, an identification of the goal owner, an indication that the goal is a public goal or a private goal or whether viewing the goal is restricted to a certain group of users, a list of subscribers or followers associated with the goal, and a link to the post and any other posts associated with the goal.

12. A non-transitory computer readable storage medium having program instructions embodied therewith, the program instructions being executable by a device to cause the device to perform a method comprising:
    receiving a special operator term entered by a user as part of a post, the special operator term automatically causing the post to be associated with a selected goal;
    upon completion of entering the special operator term, presenting a list of goals in a graphical user interface for selection by the user in response to receiving the special operator term, wherein the list of goals is used in a performance appraisal;
    adding and displaying the selected goal from the list of goals in association with the post in response to the user selecting the select goal;
    receiving content of the post entered by the user; and
    automatically associating the post with the selected goal from the list of goals.

13. The computer program product of claim 12, wherein the method further comprises storing the post in association with the selected goal in a look-up table.

* * * * *